(12) United States Patent
Aesch, Jr.

(10) Patent No.: US 6,672,000 B2
(45) Date of Patent: Jan. 6, 2004

(54) TERMITE LURE AND METHOD

(76) Inventor: Harold W. Aesch, Jr., 915 E. Fork Dr., Phoenix, AZ (US) 85048

( * ) Notice: Subject to any disclaimer, the term of this patent is extended or adjusted under 35 U.S.C. 154(b) by 0 days.

(21) Appl. No.: 10/205,339

(22) Filed: Jul. 24, 2002

(65) Prior Publication Data

US 2003/0126787 A1 Jul. 10, 2003

Related U.S. Application Data

(63) Continuation-in-part of application No. 10/043,007, filed on Jan. 8, 2002.

(51) Int. Cl.$^7$ ............................. A01M 1/20; A01M 1/02
(52) U.S. Cl. ........................................ 43/132.1; 43/131
(58) Field of Search ............................. 43/132.1, 131, 43/124

(56) References Cited

U.S. PATENT DOCUMENTS

| | | | | |
|---|---|---|---|---|
| 5,555,672 A | * | 9/1996 | Thorne et al. | 43/131 |
| 5,564,222 A | * | 10/1996 | Brody | 43/132.1 |
| 5,609,879 A | * | 3/1997 | Myles | 424/410 |
| 5,695,776 A | * | 12/1997 | Ballard et al. | 424/408 |
| 5,778,596 A | * | 7/1998 | Henderson et al. | 43/132.1 |
| 5,832,658 A | * | 11/1998 | Randon | 43/131 |
| 5,927,000 A | * | 7/1999 | Bordes, Jr. | 43/132.1 |
| 5,937,571 A | * | 8/1999 | Megargle et al. | 43/131 |
| 6,016,625 A | * | 1/2000 | Bishoff et al. | 43/132.1 |
| 6,079,150 A | * | 6/2000 | Setikas et al. | 43/132.1 |
| 6,178,834 B1 | * | 1/2001 | Cates | 73/865.8 |
| 6,195,934 B1 | * | 3/2001 | Megargle et al. | 43/131 |
| 6,202,342 B1 | * | 3/2001 | Edwards | 43/132.1 |
| 6,219,961 B1 | * | 4/2001 | Ballard et al. | 43/131 |
| 6,453,603 B1 | * | 9/2002 | Baker | 43/132.1 |
| 6,606,816 B2 | * | 8/2003 | Oi et al. | 43/132.1 |
| 2002/0134003 A1 | * | 9/2002 | Oi et al. | 43/131 |
| 2002/0134004 A1 | * | 9/2002 | Gordon | 43/132.1 |
| 2002/0157302 A1 | * | 10/2002 | Oi et al. | 43/131 |

FOREIGN PATENT DOCUMENTS

| | | | | |
|---|---|---|---|---|
| AU | 221947 B1 | * | 7/1958 | 43/131 |
| JP | 2002-53411 B1 | * | 2/2002 | |
| JP | 2002-315493 B1 | * | 10/2002 | |
| WO | WO-99/31974 B1 | * | 7/1999 | |
| WO | WO-01/01769 A1 | * | 1/2001 | |

* cited by examiner

*Primary Examiner*—Darren W. Ark
(74) *Attorney, Agent, or Firm*—John D. Lister

(57) ABSTRACT

A termite lure for use with a hole passing through a slab includes: a tubular container housing a mass of entangled cellulose fibers or a grouping of fiberboard disks; and a rod having a length greater than that of the container or grouping of fiberboard disks extending through the container or grouping. The container or grouping is slidably retained on the rod so that the lure can be easily repositioned along the length of the rod. The lure may also include an expansible plug that seals the hole in the slab. Preferably, the termite lure is used with a non-repellant termiticide and the lure in placed in the hole with the cellulose fibers or the lowermost disk of the lure in contact with the soil beneath the hole.

22 Claims, 3 Drawing Sheets

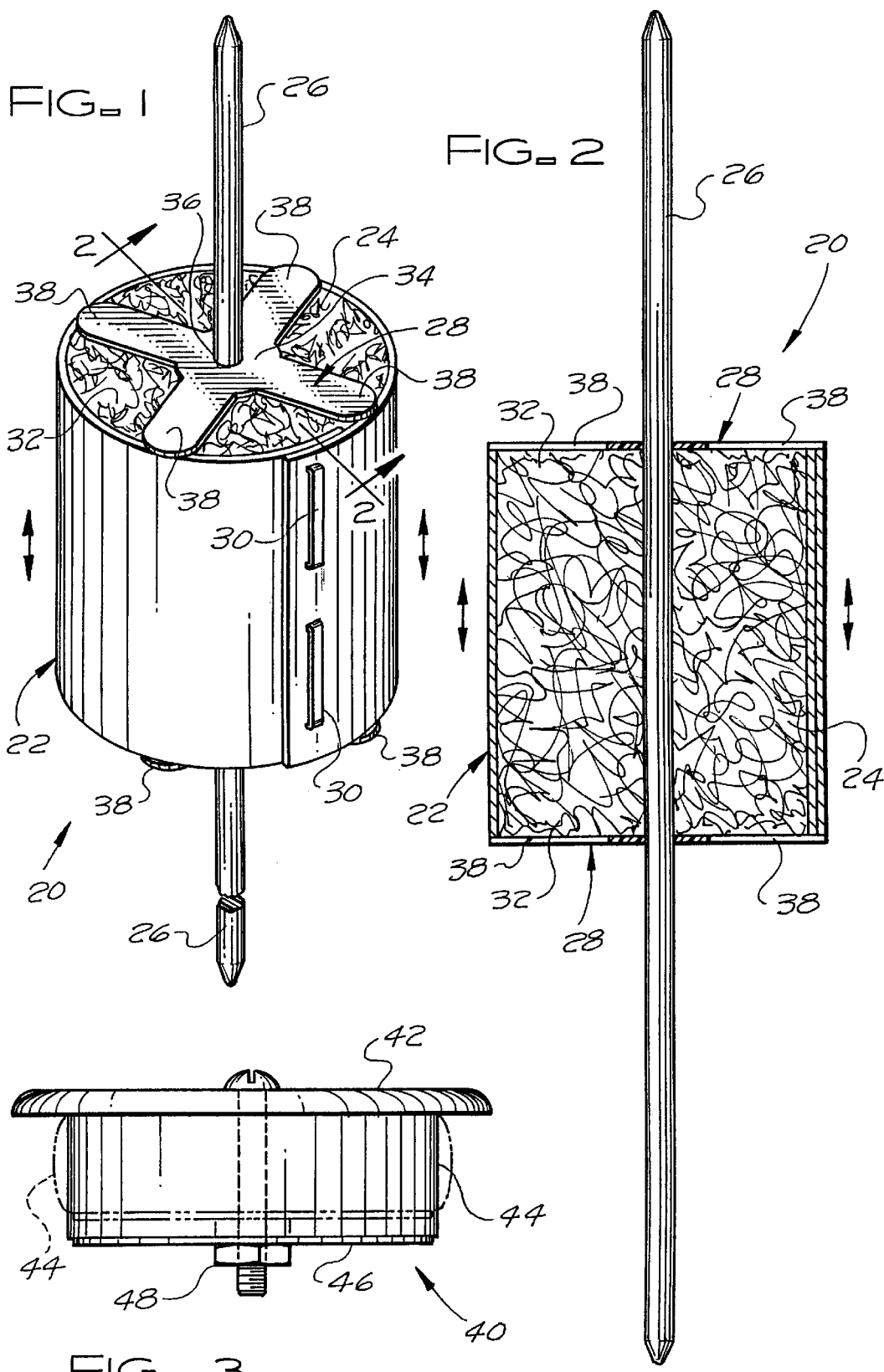

TERMITE LURE AND METHOD

This patent application is a continuation-in-part of patent application Ser. No. 10/043,007, filed Jan. 8, 2002, and entitled TERMITE LURE AND METHOD.

BACKGROUND OF THE INVENTION

The subject invention relates to a termite lure and method of treating a termite colony with a termiticide and, in particular, to a termite lure for use with a building having slabs associated therewith, e.g. concrete slabs, underneath which termites can pass to gain access to the building and a method of utilizing the lure to treat termites with a termiticide.

In many locations, especially in urban environments, office parks, and shopping centers, office, industrial, commercial and other buildings are surrounded with slabs, such as but not limited to concrete slabs, beneath which termites can pass to gain access to the buildings. These slabs are typically concrete slabs about four to six inches thick. One method of treating termites passing under these slabs with termiticides involves boring holes three inches in diameter through the slabs and into the soil beneath the slabs. Wooden sticks about three to four inches long with strings attached thereto are placed down into the holes with the strings extending from the holes so that the sticks can be retrieved when checking for termite activity. Expansible plugs are placed in and seal the upper ends of the holes in the slabs so that rainwater, debris, etc. do not pass down into the holes. The expansible plugs are also used to help keep the strings holding the wooden sticks from falling down into the holes thereby making it hard to retrieve the sticks from the holes to monitor for termite activity.

In spite of the use of the expansible plugs to hold the strings in place so that the strings can be used to retrieve the sticks from the holes to check for termite activity, the strings can fall into the holes when the expansible plugs are removed from the holes thereby making the retrieval of the sticks from the holes through the slabs difficult. In addition, frequently, there is a gap or air space between the soil beneath a slab and the underside of a slab. A stick can become wedged between the surface of the soil and the underside of a slab thereby making the retrieval of the stick more difficult and if the string is lost down the hole, as a practical matter, the stick may not be retrievable. Another consideration that must be taken into account is the need for a lure to be in contact with the soil so that the termites have easy access to the lure. If the soil has fallen away from beneath a slab and a wooden stick suspended from a string does not make contact with the soil, termites, even if present, may not be detected do to the inability of the termites to reach the lure. Thus, there has remained a need for an improved termite lure and method of treating termite colonies with termiticides where the treatment of the colonies with termiticides is performed beneath slabs.

SUMMARY OF THE INVENTION

The termite lure and method of treating termite colonies of the subject invention provides a solution to the problems currently encountered in the under slab treatment of termites with termiticides. A first embodiment of the termite lure of the subject invention includes: a tubular container (preferably, a fiberboard sheet container) with an open lower end; a mass of entangled softwood fibers within the container; a rod having a length greater than that of the container that extends through the container; and a retainer, for slidably retaining the container on the rod, that leaves an opening at the lower end of the container through which termites can gain access to the mass of cellulose fibers (preferably, softwood fibers) within the tubular fiberboard sheet container. The mass of cellulose fibers within the tubular container may be treated (e.g. saturated, coated, or impregnated) with a termiticide, preferably, a non-repellant termiticide.

A second embodiment of the termite lure of the subject invention includes a grouping or bundle of fiberboard disks that are slidably mounted on a rod having a greater length than that of the grouping of fiberboard disks. The fiberboard disks in the grouping of fiberboard disks are spaced apart by spacers to create gaps between the disks to simulate the cavities created in wood by termites. One type of spacer utilized to separate successive fiberboard disks in the grouping of fiberboard disks is a washer shaped ring. These washer shaped rings are smaller in diameter than and located between successive fiberboard disks of the grouping to space the fiberboard disks. Another type of spacer utilized to separate successive fiberboard disks in the grouping of fiberboard disks is one or more knobs that preferably are generally rounded projections formed in the fiberboard disks by dimpling. As used herein the terms "knob" or "knobs" includes rounded or other projections formed in and integral the fiberboard disks as well as small button shaped spacers, knobs, disks and similar spacers made from fiberboard or other materials and adhesively or otherwise secured to the major surfaces of the fiberboard disks to space the fiberboard disks apart. To further simulate the cavities created in wood by termites, the fiberboard disks may have holes passing between the major surfaces of the disks for the passage of termites between the successive cavities formed by the spacers between the successive disks. As with the first embodiment, the second embodiment may have lower or upper and lower retainers slidably mounted on the rod for slidably mounting the disks and spacers on the rod. By using retainers, the openings in the fiberboard disks and the washer shaped rings, when used, can be made larger in diameter to more easily slide over the rod for faster assembly of the grouping of fiberboard disks on the rod. The fiberboard disks in the grouping may be treated (e.g. saturated, coated, or impregnated) with a termiticide, preferably, a non-repellant termiticide.

The termite lures of the subject invention are particularly well suit for treatment methods wherein holes are bored through a slab into the soil beneath the slab. The termite lure may also include an expansible plug that seals the hole in the slab. In one embodiment of the subject invention, the rod carrying the tubular container with its mass of cellulose fibers or grouping of fiberboard disks is attached to the expansible plug. In the method of the subject invention, the termite lure in placed down in a hole passing through a slab with the cellulose fibers within the tubular fiberboard container or the bottommost fiberboard disk in the grouping of fiberboard disks in contact with the soil beneath the hole. Preferably, the rod carrying the tubular container with its mass of cellulose fibers or the grouping of fiberboard disks has a length greater than the depth of the hole formed through the slab and into the soil beneath the slab with the length being designed to accommodate any air gap between the surface of the soil and the underside of the slab such as that caused by the soil falling away from the slab in certain locations. Typically, the tubular container with its mass of cellulose fibers or the grouping of fiberboard disks is located on the lower portion or at the bottom of the rod when the container is inserted into a hole in the slab. Where soil conditions permit, the rod is pushed into the soil beneath the hole in the slab and soil until the lower end of the tubular container and the mass of cellulose fibers within the container or the bottommost disk in the grouping of fiberboard disks come in direct contact with the surface of the soil. Where soil conditions do not permit the rod to be pushed into the soil, the lower end of the tubular container or the bottommost disk in the grouping of fiberboard disks may be located at the bottom of the rod and the rod with the tubular container or grouping of disks can be inserted into the hole formed in the slab and soil beneath the slab until the lower end of the tubular container and the mass of cellulose fibers within the container or the bottommost disk in the grouping of fiberboard disks come in direct contact with the surface of the soil. If required, the upper end of the rod may be cut off so that an expansible plug can be inserted into the hole in the slab to seal the hole. Where the termite lure is connected to the expansible plug and the rod can not be pushed down into the soil, the lower end of the rod may be cut off after the depth of the hole is determined to locate the container with its mass of cellulose fibers or the bottommost fiberboard disk in the grouping of fiberboard disks on the surface of the ground.

In the preferred method of the subject invention, when termite activity is detected in and/or around the termite lure, the soil beneath and surrounding the termite lure is treated with a termiticide (preferably, a non-repellant termiticide) to a desired depth. The mass of cellulose fibers within the container may also be treated with a termiticide (preferably a non-repellant termiticide) when the lure is initially installed or after the initial installation of the termite lure when termite activity is detected in and/or around the termite lure.

BRIEF DESCRIPTION OF THE DRAWINGS

FIG. 1 is a perspective view of a first embodiment of the termite lure of the subject invention.

FIG. 2 is a vertical cross section of the termite lure of FIG. 1 taken substantially along lines 2—2 of FIG. 1.

FIG. 3 is a side view of an expansible plug that can be part of a termite lure assembly utilizing the termite lures of FIGS. 1, 7 or 8.

DESCRIPTION OF THE PREFERRED EMBODIMENTS

Figure 4:
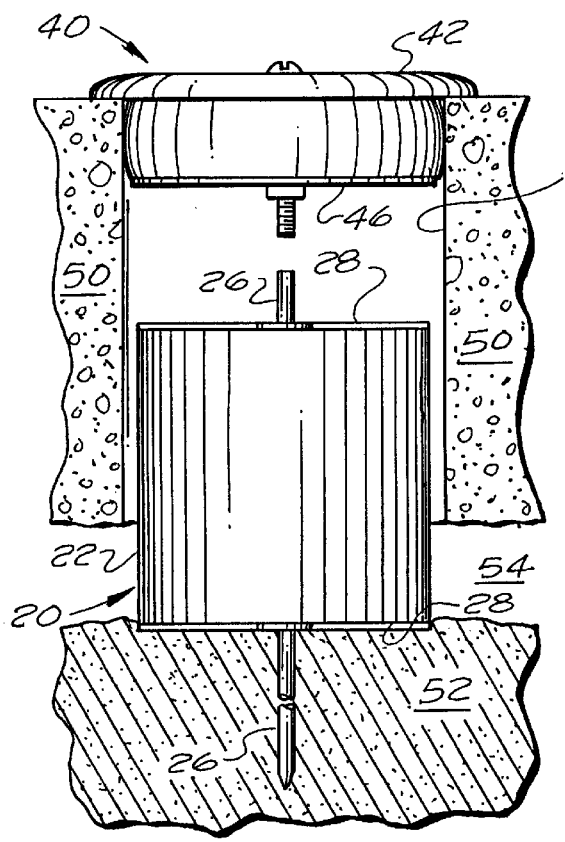
FIG. 4 is a vertical cross section through a slab with a termite lure assembly utilizing the components of FIGS. 1 to 3 installed within a hole passing through the slab and into the soil beneath the slab.

Referring to FIGS. 1 and 2, the first embodiment 20 of the termite lure of the subject invention includes: a tubular container 22 (preferably a tubular fiberboard sheet container); a mass 24 of entangled cellulose fibers within the container 22; a rod 26, having a length greater than that of the container 22, that extends through the container 22 along the longitudinal axis of the container 22; and upper and lower retainers 28, for slidably retaining the container 22 on the rod 26. The tubular container 22 is typically about 2½ to about 2¾ inches in diameter by about 2½ to about 3½ inches in length. The rod 26 is typically made of plastic so that it can be easily cut off to a desired length when being installed and, while the length of the rod may vary, the rod 26 typically has a length of about 8 to about 18 inches.

Preferably, the tubular container 22 is made of an uncoated fiberboard sheet of market pulp such as a sheet market pulp sold by Georgia Pacific Corporation under the trade designation "Leaf River 90 Softwood" "Southern Bleached Softwood" market pulp. This market pulp is a long fiber (typically 2.47 mm in average length with a coarseness of about 0.293 mg/m) bleached southern softwood pulp that is Elemental Chlorine Free (ECF) and typically includes 90% loblolly pine and 10% longleaf and slash. When made of fiberboard sheet material, the tubular fiberboard sheet container 22 is formed by spirally wrapping a sheet of uncoated market pulp into a tube with a hollow core. While as shown the tubular wall of the container 22 has only one layer with overlapping end portions that are stapled together with staples 30, the tubular wall of the container 22 may be formed of several spirally wrapped layers of the sheet with the end portion of the outer layer stapled to the underlying layers. The upper and lower ends 32 of the tubular fiberboard sheet container are open.

Preferably, the mass 24 of cellulose fibers within the tubular container 22 is a coherent deformable compressible mass of randomly oriented, entangled softwood fibers: that is held together by the entanglement of the fibers, that can be conformed to the interior of the container 22, and that has sufficient integrity to extend to and/or beyond the open upper and lower ends 32 of the container 22 to completely fill the container. In particular, it is desirable to have the mass 24 of cellulose fibers extending to and/or beyond the open lower end of the container 22 so that the mass 24 of cellulose fiber will be in contact with the soil when the termite lure 20 is placed within a hole passing through a slab for the detection and treatment of termites. The mass 24 of cellulose fibers exhibits a resilience that causes the mass of cellulose fibers to at least partially recover and, preferably, substantially entirely recover its precompressed thickness when the compressive forces are released, e.g. recovering from 50% to substantially all of its precompressed thickness.

The preferred softwood fibers used to form the coherent deformable mass 24 of randomly oriented, entangled cellulose fibers are predominately bleached loblolly pine fibers that are elemental chlorine free. One source of such fibers can be obtained by hammer milling uncoated free sheets of market pulp such as market pulp sold by Georgia Pacific Corporation under the trade designation "Leaf River 90 Softwood" "Southern Bleached Softwood" market pulp. This market pulp is a long fiber (typically 2.47 mm in average length with a coarseness of about 0.293 mg/m) bleached southern softwood pulp that is Elemental Chlorine Free (ECF) and typically includes 90% loblolly pine and 10% longleaf and slash. While the mass of cellulose fibers may include a binder, preferably, the mass 24 of cellulose fibers is binderless.

Preferably, the mass of cellulose fibers is prepared from pressed sheets of digested, bleached and washed softwood fibers, e.g. loblolly pine fibers, such as the 42×45×3/32 inch sheets of market pulp discussed above that are sold by Georgia Pacific Corporation under the trade designation "Leaf River 90 Softwood" "Southern Bleached Softwood" market pulp. These pressed sheets are broken up, e.g. with a hammer mill, to release the softwood fibers from the sheets. The released softwood fibers are mixed with large quantities of air to form a mixture of air and softwood fibers that fluffs the released softwood fibers. The mixture of air and softwood fibers is then strained through a porous cloth or screen to form a coherent deformable compressible resilient mass of randomly oriented entangled softwood fibers that typically has the consistency of a cotton ball and is held together by the entanglement of the fibers. Termites can easily burrow into this mass of fibers and this mass of fibers is easy for termites to digest. The mass 24 of fibers easily absorbs moisture, pesticides or termiticides when applied to the mass and readily clings to the interior walls of the container 22. The mass is ready for the termites to eat, and unlike baits previously used, such as wood sticks, does not need separation or a fungus to break it down for easy consumption by the termites.

While other retainers could be used to hold the container 22 with its mass 24 of cellulose fibers on the rod 26, preferably, the upper and lower retainers 28 that hold the container on the rod 26 are mounted on the rod 26 by frictionally gripping the rod 26. The frictional resistance between the retainers 28 and the rod 26, to relative sliding movement between the retainers 28 and the rod 26, holds the retainers on the rod 26 while permitting the retainers to be slid along the rod when adjusting the position of the tubular container 22 on the rod 26. The retainers 28 each include a hub 34 with a central opening 36 that frictionally grips the rod 26 and a plurality of spaced apart spokes 38. The spokes 38 of the retainers are integral with and extend radially outward from the hubs 34 of the retainers to engage the upper and lower ends of the tubular wall of the tubular container 22. Thus, the tubular container 22 can be slid up or down the rod 26 along with the retainers 28 which hold the tubular container 22 on the rod 26. The spaced apart spokes 36 leave openings in the retainers 28 so that the mass 24 of cellulose fibers can extend to and/or through open upper and lower ends of the container. Thus, the mass 24 of cellulose fibers can be place in contact with the ground surface when installed and with no air gaps between the mass of cellulose fibers and the ground surface, the termites have ready access to the mass of softwood fibers within the tubular fiberboard sheet container 22. Preferably, the retainers are made of a thin resilient sheet material such as plastic or sheet metal material, e.g. a resilient sheet material about 1/32 of an inch in thickness.

The termite lure 20 may be used with an expansible plug 40, such as the expansible plug shown in FIG. 3. The expansible plug 40 includes a cover 42, a deformable and resilient cylindrical plug portion 44; a compression plate 46; and a bolt and nut assembly 48. The cylindrical plug portion 44 is located intermediate the underside of the cover 42 and the compression plate 46. The cover 42 is greater in diameter than the cylindrical plug portion 44 and the compression plate 46 is typically a little less than but about the same diameter as the diameter of the cylindrical plug portion 44. The nut of the nut and bolt assembly 48 is integral with the compression plate. Accordingly, by tightening the bolt and nut assembly 48, the cylindrical plug portion 44 is compressed between the underside of the cover 42 and the compression plate 46 and expands radially as shown in phantom line in FIG. 3. When the bolt and nut assembly 48 is loosened the cylindrical plug portion 44 returns to its original diameter and shape. The cover 42 of the expansible plug 40 is typically about 3½ to 4 inches in diameter. When not compressed, the cylindrical plug portion 44 of the expansible plug 40 is typically about 2⅞ inches in diameter and about 1 inch in height.

FIG. 4 shows the termite lure 20 and the expansible plug 40 installed within a hole passing through a slab 50, e.g. a concrete slab, and into the ground or soil 52 beneath the slab. As shown, there is an air gap or air space 54 between the underside of the slab 50 and the surface of the ground 52 beneath the slab. The hole 56 through the slab 50 and into the ground beneath the slab 50 is typically about 3 inches in diameter. As discussed above, the container 22 of the termite lure 20 is typically about 2½ to about 2¾ inches in diameter by about 3 to about 3½ inches in length and the rod 26 is typically about 12 to about 18 inches in length. Since the container of the termite lure 20 is smaller in diameter than the hole 56, the termite lure 20 can be inserted down into the hole 56 through the slab 50 and the lower end of the tubular container 22 and the bottom of the mass 24 of cellulose fibers within the container 22 can be located on the surface of the ground 52. Typically, when the termite 20 lure is inserted into the hole 56, the tubular fiberboard container 22 is positioned with the lower end of the container 22 at or adjacent the lower end of the rod 26. With the tubular container 22 in this position, if soil conditions permit the rod 26 can be pushed through the container 22 and into the ground 52 until the upper end of the rod 26 is at the desired level within the hole 56, e.g. about 1½ to 2 inches down in the hole 56 and clear of the bottom of the expansible plug 40. If the soil is too hard to insert the rod 26 down into the ground 52 or if rocks or other obstacles in the soil prevent the rod 26 from being pushed down into the ground until the upper end of the rod 26 is at a desired level within the hole 56, the upper end of the rod 26 can be cut off to locate the upper end of the remainder of the rod 26 at a desired height. The expansible plug 40 is then inserted into the hole 56 and the bolt and nut assembly 48 is tightened to expand the cylindrical plug portion 44 into sealing engagement with the wall of the hole 56 in the slab 50 to seal the hole and prevent water and debris from entering the hole.

Figure 5:
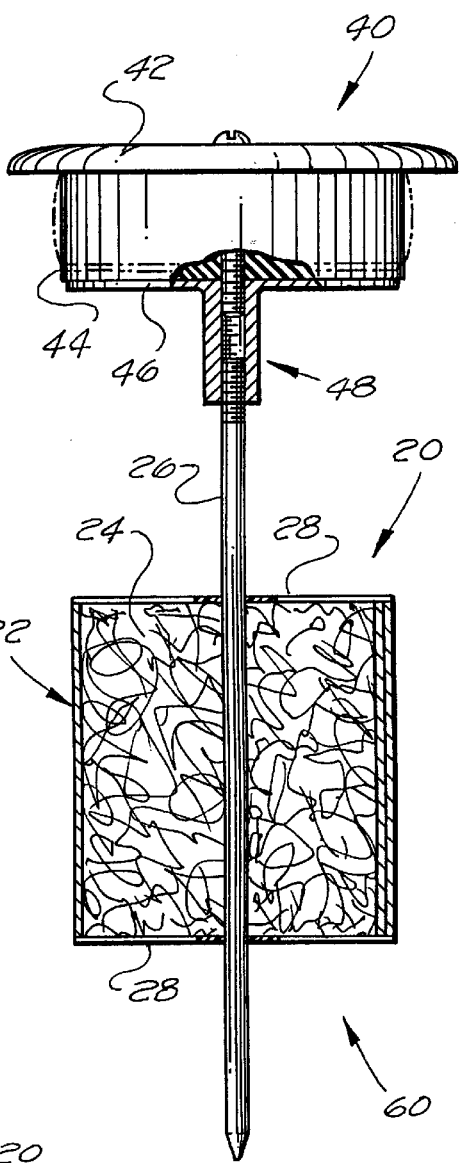
FIG. 5 is a vertical cross section through the first embodiment of the termite lure assembly of the subject invention wherein the termite lure of FIG. 1 is secured to the expansible plug.
Figure 6:
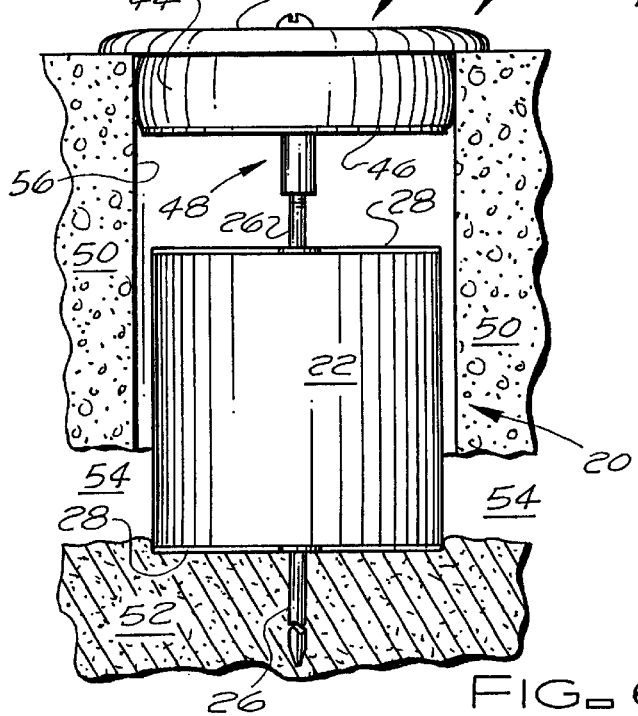
FIG. 6 is a vertical cross section through a slab with the termite lure assembly of FIG. 5 installed within a hole passing through the slab and into the soil beneath the slab.

FIGS. 5 and 6 show a termite lure/expansible plug assembly 60 of the subject invention wherein the termite lure 20 is secured to the expansible plug 40. In this embodiment of the invention the nut of the nut and bolt assembly 48 is an elongated nut. The bolt passing through the cover 42, the cylindrical plug portion 44, and the compression plate 46 is threaded into the upper end of the nut. The nut is integral with the compression plate 46. Accordingly, by tightening the bolt and nut assembly 48, the cylindrical plug portion 44 is compressed between the underside of the cover 42 and the compression plate 46 and expands radially as shown in phantom line in FIG. 5. When the bolt and nut assembly 48 is loosened the cylindrical plug portion 44 returns to its original diameter and shape. The termite lure 20 of this embodiment is the same as the termite lure of FIGS. 1 and 2, with one exception, the upper end of the rod 26 is threaded into (as shown in FIG. 5) or otherwise secured to the lower end of the nut of the nut and bolt assembly 48.

FIG. 6 shows the termite lure/expansible plug assembly 60 installed within a hole passing through a slab 50, e.g. a concrete slab, and into the ground or soil 52 beneath the slab. As shown, there is an air gap or air space 54 between the underside of the slab 50 and the surface of the ground 52 beneath the slab. The hole 56 through the slab 50 and into the ground beneath the slab 50 is typically about 3 inches in diameter. As discussed above, the container 22 of the termite lure 20 of the assembly 60 is typically about 2½ to about 2¾ inches in diameter by about 3 to about 3½ inches in length and the rod 26 is typically about 12 to about 18 inches in length. Since the termite lure 20 of the assembly 60 is smaller in diameter than the hole 56, the termite lure 20 can be inserted down into the hole 56 through the slab 50 and the lower end of the tubular container 22 and the bottom of the mass 24 of cellulose fibers within the container 22 can be located on the surface of the ground 52. Typically, when the termite 20 lure is inserted into the hole 56, the tubular container 22 is positioned with the lower end of the container 22 at or adjacent the lower end of the rod 26. With the tubular container 22 in this position, if soil conditions permit the rod 26 can be pushed through the container 22 and into the ground 52 until the cover 42 of the expansible plug 40 comes to rest on the upper surface of the slab 50. If the soil is too hard to insert the rod 26 down into the ground 52 or if rocks or other obstacles in the soil prevent the rod 26 from being pushed down into the ground until the cover 42 of the expansible plug 40 of the assembly 60 comes to rest on the upper surface of the slab 50, the lower end of the rod 26 can be cut off so that the rod 26 does not have to penetrate into the ground or so that the rod only has to penetrate a distance into the ground permitted by the soil conditions. The length of rod that must be cut off from the bottom of the rod 26 can be easily determined by inserting the assembly 60 into the hole 56 in the slab. The spacing between the bottom surface of the cover 42 and the upper surface of the slab 50 when the rod 26 will not penetrate further into the soil is the length that must be removed from the bottom of the rod 26 so that the lower end of the tubular container 22 and the mass 24 of cellulose fibers within the container rest on the upper surface of the ground. After the assembly 60 is inserted into the hole 56, the bolt and nut assembly 48 is tightened to expand the cylindrical plug 46 into sealing engagement with the wall of the hole 56 in the slab 50 to seal the hole and prevent water and debris from entering hole.

Figure 7:
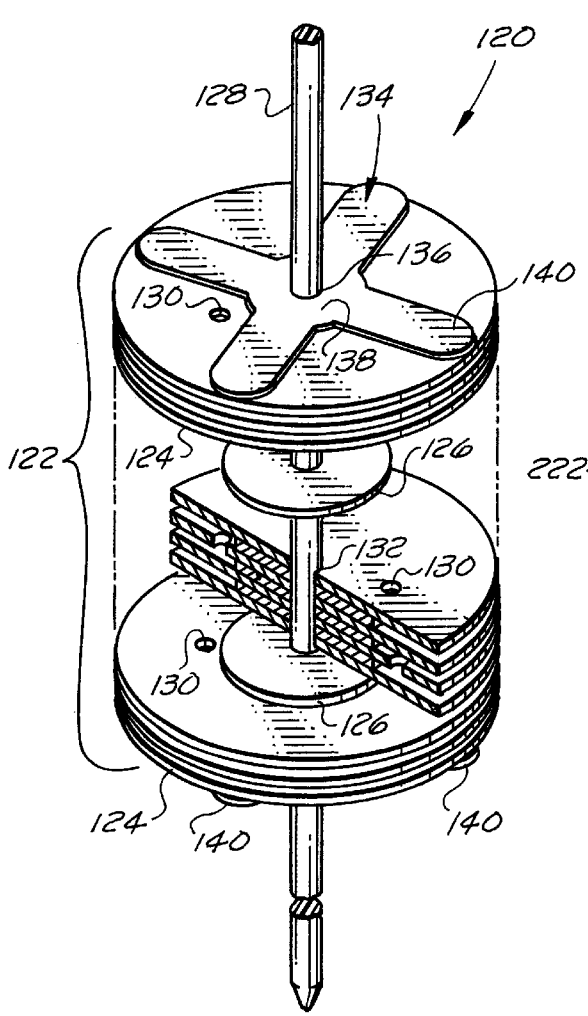
FIG. 7 is an exploded perspective view, in partial cross section, of a second embodiment of the termite lure of the subject invention formed by a grouping of fiberboard disks spaced apart by washer shaped rings.

Referring to FIG. 7, FIG. 7 shows one form 120 of the second embodiment of the termite lure of the subject invention that is not housed within a container. The termite lure 120, includes: a grouping or bundle 122 of fiberboard disks 124 and spacers 126; and a rod 128, having a length greater than that of the grouping 122 of fiberboard disks and spacers, that extends through the grouping 122 of fiberboard disks and spacers along the longitudinal axis of the grouping 122. Preferably, the spacers 126 are washer shaped rings that are made of fiberboard and are smaller in diameter (e.g. between about ¾ and 1¼ inches in diameter) than the diameter of the fiberboard disks 124 (e.g. between about 2 and about 2¾ inches in diameter). Each spacer 126 is located between successive fiberboard disks 124 in the grouping 122 of fiberboard disks and spacers to space the successive fiberboard disks 124 apart and create gaps between the successive fiberboard disks 124 that simulate the cavities in wood created by termites. Typically, the fiberboard disks 124 and the spacers 126 are between about 1/16 of an inch and about ⅛ of an inch in thickness and the grouping 122 of fiberboard disks and spacers is from about 2½ to about 3½ inches in length. While the fiberboard disks 124 may range in thickness (e.g. up to about ¼ of an inch in thickness), preferably the spacers 126 are between about 1/16 of an inch and about ⅛ of an inch in thickness to create a preferred spacing between successive fiberboard disks 124 for the simulation of a termite cavity.

Preferably, at least some and, most preferably, all of the fiberboard disks 124 have one or more holes 130 passing completely through the disks from a lower major surface of the disk to an upper major surface of the disk. Preferably, the holes 130 are between 1/32 of an inch and ⅛ of an inch in diameter and are located in the disks 124 radially outward from the outer peripheral edges of the spacers 126 in the grouping 122 so that the spacers 126 do not block the holes. The holes 130 further simulate the cavities in wood created by termites and facilitate termite movement through the termite lure 120 between the cavities formed between successive fiberboard disks 124 by the spacers 126.

The fiberboard disks 124 of the grouping 122 or at least the lowermost fiberboard disk or the lowermost and uppermost fiberboard disks of the grouping 122 may be provided with central bores 132 having diameters slightly less than the diameter of the rod 128 so that the fiberboard disks 124 frictionally grip the rod 128. The frictional resistance between the central bores 132 in the fiberboard disks and the rod 128, to relative sliding movement between the fiberboard disks 124 and the rod 128, holds the grouping 122 of fiberboard disks and spacers on the rod 128 while permitting the grouping 122 of fiberboard disks and spacers to be slid along the rod when adjusting the position of the grouping 122 of fiberboard disks and spacers on the rod 128.

The termite lure 122 may also include lower or upper and lower retainers 134, for slidably retaining the grouping 122 of fiberboard disks and spacers on the rod 128. The retainers 134 are provided with central bores 136 having diameters slightly less than the diameter of the rod 128 so that the retainers 134 frictionally grip the rod 128. The frictional resistance between the central bores 136 in the retainers 134 and the rod 128, to relative sliding movement between the retainers 134 and the rod 128, holds the grouping 122 of fiberboard disks and spacers on the rod 128 while permitting the grouping 122 of fiberboard disks and spacers to be slid along the rod when adjusting the position of the grouping 122 of fiberboard disks and spacers on the rod 128. The use of lower or upper and lower retainers 134 permits the use of larger central bores in all of the fiberboard disks and spacers of the grouping 122 so that the fiberboard disks 124 and spacers 126 may be more easily slid over the rod 128 during assembly of the termite lure 122.

While other retainers could be used, preferably the retainers 134 each include a hub 138 through which the central bore 136 passes and radially extending spokes 140. The spokes 140 of the retainers are integral with and extend radially outward from the hubs 138 of the retainers to engage the lower surface of the lowermost fiberboard disk in the grouping 122 and the upper surface of the uppermost fiberboard disk in the grouping 122. The spaced apart spokes 140 leave openings in the retainers 134 so that the lowermost fiberboard disk of the grouping 122 can be placed in contact with the ground surface when installed with no air gaps between the lowermost fiberboard disk of the grouping 122 and the ground surface so that the termites have ready access to the fiberboard of the termite lure 120. Preferably, the retainers are made of a thin resilient sheet material such as plastic or sheet metal material, e.g. a resilient sheet material about 1/32 of an inch in thickness.

Figure 8:
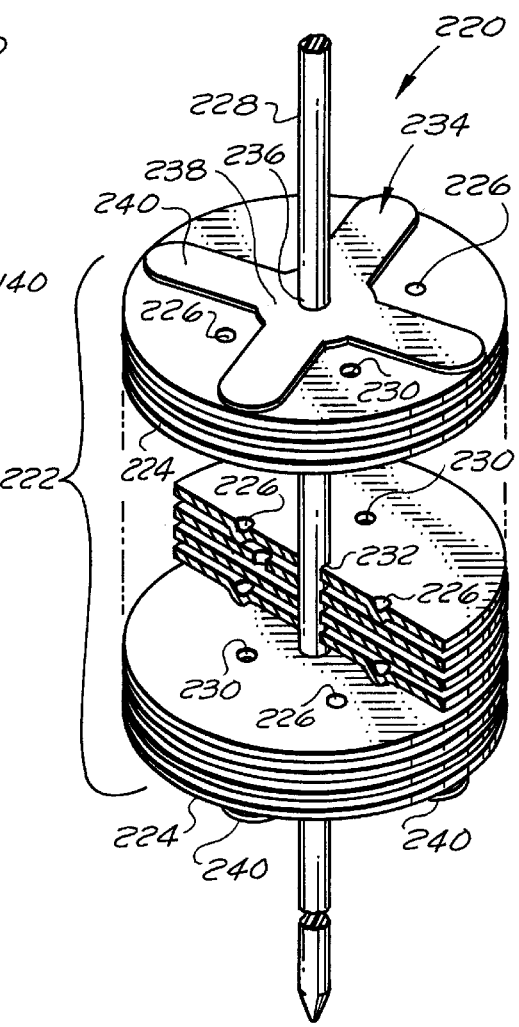
FIG. 8 is an exploded perspective view, in partial cross section, of the second embodiment of the termite lure of the subject invention with the fiberboard disks of the lure spaced apart by knobs formed in the disks.

Referring to FIG. 8, FIG. 8 shows another form 220 of the second embodiment of the termite lure of the subject invention that is not housed within a container. The termite lure 220, includes: a grouping or bundle 222 of fiberboard disks 224 and spacers 226; and a rod 228, having a length greater than that of the grouping 222 of fiberboard disks and spacers, that extends through the grouping 222 of fiberboard disks and spacers along the longitudinal axis of the grouping 222. Preferably, the fiberboard disks 124 are between about 2 and about 2¼ inches in diameter and between about 1/16 of an inch and about ⅙ of an inch in thickness. However, the fiberboard disks 224 may range up to about ¼ of an inch in thickness.

Figure 9:
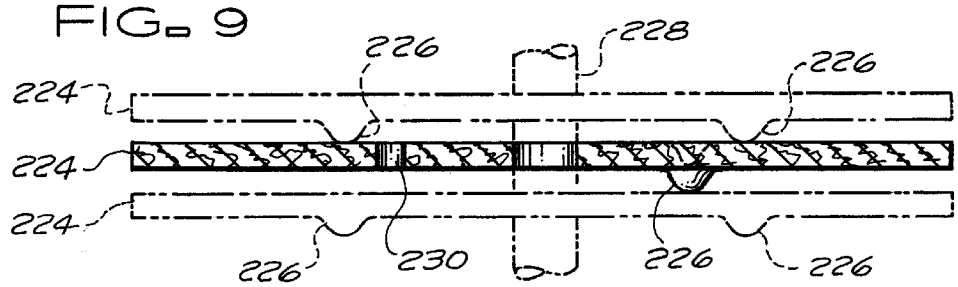
FIG. 9 is a cross section on a larger scale than FIG. 8 of a portion of the termite lure of FIG. 8, with the fiberboard disks of the lure in solid and phantom line.

As shown in FIG. 9, each spacer 226 has one or more knobs. Preferably, the knobs are formed in the fiberboard disks 224 by dimpling the disks and are integral with the disks. Each spacer 226, located between successive fiberboard disks 224 in the grouping 222 of fiberboard disks, spaces the successive fiberboard disks 224 apart and create gaps between the successive fiberboard disks 224 that simulate the cavities in wood created by termites. Typically, the spacers 226 project between about 1/16 of an inch and about ⅛ of an inch above one of the major surfaces of the disk 224 to thereby create a preferred spacing between successive fiberboard disks 124 for the simulation of a termite cavity. Preferably, the grouping 222 of fiberboard disks and spacers is from about 2½ to about 3½ inches in length.

Preferably, at least some and, most preferably, all of the fiberboard disks 224 have one or more holes 230 passing completely through the disks from a lower major surface of the disk to an upper major surface of the disk. Preferably, the holes 230 are between 1/32 of an inch and ⅛ of an inch in diameter and are offset radially, relative to the spacers 226, so that the spacers can not line up with and be inadvertently inserted into the holes 230 located in the disks 224 to block the holes 230 when assembling the grouping of fiberboard disks 222. The holes 230 further simulate the cavities in wood created by termites and facilitate termite movement through the termite lure 220 between the cavities formed between successive fiberboard disks 224 by the spacers 226.

The fiberboard disks 224 of the grouping 222 or at least the lowermost fiberboard disk or the lowermost and uppermost fiberboard disks of the grouping 222 may be provided with central bores 232 having diameters slightly less than the diameter of the rod 228 so that the fiberboard disks 224 frictionally grip the rod 228. The frictional resistance between the central bores 232 in the fiberboard disks and the rod 228, to relative sliding movement between the fiberboard disks 224 and the rod 228, holds the grouping 222 of fiberboard disks and spacers on the rod 228 while permitting the grouping 222 of fiberboard disks and spacers to be slid along the rod when adjusting the position of the grouping 222 of fiberboard disks and spacers on the rod 228.

The termite lure 222 may also include lower or upper and lower retainers 234, for slidably retaining the grouping 222 of fiberboard disks and spacers on the rod 228. The retainers 234 are provided with central bores 236 having diameters slightly less than the diameter of the rod 228 so that the retainers 234 frictionally grip the rod 228. The frictional resistance between the central bores 236 in the retainers 234 and the rod 228, to relative sliding movement between the retainers 234 and the rod 228, holds the grouping 222 of fiberboard disks and spacers on the rod 228 while permitting the grouping 222 of fiberboard disks and spacers to be slid along the rod when adjusting the position of the grouping 222 of fiberboard disks and spacers on the rod 228. The use of lower or upper and lower retainers 234 permits the use of larger central bores in all of the fiberboard disks and spacers of the grouping 222 so that the fiberboard disks 224 and spacers 226 may be more easily slid over the rod 228 during assembly of the termite lure 222.

While other retainers could be used, preferably the retainers 234 each include a hub 238 through which the central bore 236 passes and radially extending spokes 240. The spokes 240 of the retainers are integral with and extend radially outward from the hubs 238 of the retainers to engage the lower surface of the lowermost fiberboard disk in the grouping 222 and the upper surface of the uppermost fiberboard disk in the grouping 222. The spaced apart spokes 240 leave openings in the retainers 234 so that the lowermost fiberboard disk of the grouping 222 can be placed in contact with the ground surface when installed with no air gaps between the lowermost fiberboard disk of the grouping 222 and the ground surface so that the termites have ready access to the fiberboard of the termite lure 220. Preferably, the retainers are made of a thin resilient sheet material such as plastic or sheet metal material, e.g. a resilient sheet material about 1/32 of an inch in thickness.

The rods 128 and 228 of the termite lures 120 and 220 are identical to the rod 26 of termite lure 20. Like the rod 26, the rods 128 and 228 are typically made of plastic so that the rods can be easily cut off to a desired length when being installed and, while the length of the rods may vary, the rods 128 and 228 typically have a length of about 8 to about 18 inches. The termite lures 120 and 220 may be used with expansible plugs such as but not limited to the expansible plug 40 shown in FIG. 3 and 4. When used with expansible plugs such as the expansible plug 40 of FIG. 3, the upper ends of rods 128 and 228 may be like the upper end of rod 26 as shown in FIG. 2. The termite lures 120 and 220 may also be used with expansible plugs such as but not limited to the expansible plug 40 of FIGS. 5 and 6 wherein the upper end of the rods are threaded into the integral nut of the compression plate 46. When used with expansible plugs such as the expansible plug 40 of FIGS. 5 and 6, the upper ends of rods 128 and 228 may be threaded like the upper end of rod 26 as shown in FIG. 5.

Preferably, the fiberboard disks 124 and 224 are made from an uncoated fiberboard sheet of market pulp such as a sheet market pulp sold by Georgia Pacific Corporation under the trade designation "Leaf River 90 Softwood" "Southern Bleached Softwood" market pulp. This market pulp is a long fiber (typically 2.47 mm in average length with a coarseness of about 0.293 mg/m) bleached southern softwood pulp that is Elemental Chlorine Free (ECF) and typically includes 90% loblolly pine and 10% longleaf and slash.

In the method of the subject invention, the termite lure 20, 120 or 220 is placed down in a hole 56 passing through the slab 50 with the mass 24 of cellulose fibers within the tubular container 22 of the termite lure 20, the lowermost fiberboard disk 124 of the termite lure 120, or the lowermost fiberboard disk 224 of the termite lure 220 in contact with the soil beneath the hole. Typically, the tubular container 22 with its mass 24 of cellulose fibers, the grouping 122 of fiberboard disks 124, or the grouping of fiberboard disks 224 is located on the lower portion of the rod 26, 128 or 228 so that as the termite lure 20, 120 or 220 is inserted into the hole 56 in the slab and slides up the rod as the rod is pushed into the soil.

The termite lure 20 is inserted into the hole 56 until the lower end of the tubular container 22 and the mass 24 of cellulose fibers within the container come in direct contact with the surface of the soil. When using the termite lure 20 as shown in FIG. 4, where the termite lure 20 is not secured to the expansible plug 40, the lower end of the rod 26 is pushed into the soil or a portion of the lower or upper end of the rod 26 is cut off so that the upper end portion of the rod 26 still extends up into the hole 56 and can be easily grasped to remove the termite lure from the hole to check for termite activity and/or treat the location with a termiticide. Typically, the upper end of the rod would be immediately below the underside of the expansible plug 40, e.g. about 1½ inches below the upper surface of the slab 50. When using the termite lure 20 as shown in FIG. 5, where the termite lure 20 is secured to the expansible plug 40, the bottom end of the rod 26 is pushed into the soil until the mass 24 of cellulose fibers within the container comes in direct contact with the surface of the soil or where the soil is too hard to push the rod 26 into the soil, a lower portion of the rod is cut off so that the mass 24 of cellulose fibers within the container comes in direct contact with the surface of the soil.

Like the termite lure 20, the termite lure 120 is inserted into the hole 56 until the lowermost fiberboard disk 124 of the grouping 122 of fiberboard disks and spacers comes in direct contact with the surface of the soil and the termite lure 220 is inserted into the hole 56 until the lowermost fiberboard disk 224 of the grouping 222 of fiberboard disks spacers comes in direct contact with the surface of the soil. Where the termite lure 120 or 220, like termite lure 20 as shown in FIG. 4, is not secured to the expansible plug 40, the lower end of the rod 128 or 228 is pushed into the soil or a portion of the lower or upper end of the rod 128 or 228 is cut off so that the upper end portion of the rod 128 or 228 still extends up into the hole 56 and can be easily grasped to remove the termite lure from the hole to check for termite activity and/or treat the location with a termiticide. Typically, the upper end of the rod 128 or 228 would be immediately below the underside of the expansible plug 40, e.g. about 1½ inches below the upper surface of the slab 50. When using the termite lure 120 or 220 like the termite lure 20 as shown in FIG. 5, where the termite lure 120 or 220 is secured to the expansible plug 40, the bottom end of the rod 128 or 228 is pushed into the soil until the lowermost fiberboard disk 124 or 224 of the lure comes in direct contact with the surface of the soil or where the soil is too hard to push the rod 128 or 228 into the soil, a lower portion of the rod is cut off so that the fiberboard disk 124 or 224 comes in direct contact with the surface of the soil.

In the preferred method of the subject invention, when termite activity is detected in and/or around the termite lure 20, 120 or 220, the soil beneath and surrounding the termite lure 20, 120 or 220 is treated with a termiticide (preferably, a non-repellant termiticide) to a desired depth. When using the termite lure 20, the mass 24 of cellulose fibers (preferably softwood fibers) within the tubular container 22 may also be treated with a termiticide (preferably a non-repellant termiticide) when the lure is initially installed or after the initial installation of the termite lure when termite activity is detected in and/or around the termite lure. When using the termite lures 120 or 220, the fiberboard disks 124 or 224 may also be treated with a termiticide (preferably a non-repellant termiticide) when the lure is initially installed or after the initial installation of the termite lure when termite activity is detected in and/or around the termite lure.

In the preferred method of the subject invention, the termiticide is non-repellent to termites and lethal or injurious to termites through matrix contact as well as through ingestion and/or transferal. An example of a preferred termiticide, which is non-repellent to termites and lethal to termites through contact as well as through ingestion and/or transferal, is a termiticide containing fipronil as its active ingredient. Aventis Environmental Science USA of Montvale, N.J. sells such a termiticide under the trade designation "TERMIDOR". Since the termites do not smell, see or feel this termiticide, the termites continue to pass freely through the treated area of the tunnel tube(s) picking up the termiticide and carrying the termiticide back to the colony nest. In the colony nest, other termites that contact the contaminated termites through feeding or grooming or through cannibalizing the termites killed by the termiticide become carriers of the termiticide thereby spreading the termiticide throughout the colony. The mass 24 of cellulose fibers within the tubular container 22 of the termite lure 20 is treated with a termiticide by coating, saturating, impregnating or otherwise treating the mass of cellulose fibers with the termiticide. The fiberboard disks 124 and 224 of the termite lures 120 and 220 are treated with a termiticide by coating, saturating, impregnating or otherwise treating the disks with the termiticide.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A termite lure assembly for use in the treatment of termites in holes passing through slabs and the like, comprising:

a grouping of fiberboard disks made of cellulose fibers; the grouping of fiberboard disks having a length and a longitudinal axis; the grouping of fiberboard disks having a lowermost fiberboard disk;

spacer means spacing successive fiberboard disks of the grouping of fiberboard disks apart to simulate termite created cavities between the successive fiberboard disks;

a rod, having a length greater than the length of the grouping of fiberboard disks, extending through the grouping of fiberboard disks along the longitudinal axis of the grouping of fiberboard disks; and the rod passing through a retaining means that frictionally grips a lateral surface of the rod and is slidably mounted on the rod; the retaining means slidably retaining the grouping of fiberboard disks on the rod so that the grouping of fiberboard disks can be moved vertically along the rod and positioned at different locations along the length of the rod to permit a lower end of the rod to extend from a lower end of the grouping of fiberboard disks for insertion of the rod into soil beneath a hole and the lowermost fiberboard disk of the grouping of fiberboard disks to be brought into contact with the soil beneath the hole.

2. The termite lure assembly according to claim 1, wherein:

the cellulose fibers of the fiberboard disks are softwood fibers.

3. The termite lure assembly according to claim 2, wherein:

the fiberboard disks are treated with a non-repellant termiticide.

4. The termite lure assembly according to claim 2, wherein:

the spacer means are washer shaped rings slidably mounted on the rod.

5. The termite lure assembly according to claim 2, wherein:

the spacer means are knobs formed in the fiberboard disks.

6. The termite lure assembly according to claim 2, wherein:

the termite lure assembly includes an expansible plug adapted to be received within a hole passing through a slab wherein the expansible plug in an unexpanded state can be inserted into the hole passing through the slab and in an expanded state grips an internal surface of the hole passing through the slab to seal the hole passing through the slab.

7. The termite lure assembly according to claim 6, wherein:

an upper end of the rod is secured to an underside of the expansible plug.

8. The termite lure assembly according to claim 1, wherein:

the retaining means includes a first retaining member with a hub having a central hole therethrough that frictionally grips a lateral surface of the rod and spokes that extend radially outward from the hub and engage an underside of the lowermost fiberboard disk of the grouping of fiberboard disks.

9. The termite lure assembly according to claim 8, wherein:

the retaining means includes a second retaining member with a hub having a central hole therethrough that frictionally grips the lateral surface of the rod and spokes that extend radially outward from the hub of the second retaining member and engage an upper side of an uppermost fiberboard disk of the grouping of fiberboard disks.

10. The termite lure assembly according to claim 1, wherein:

the fiberboard disks are treated with a non-repellant termiticide.

11. The termite lure assembly according to claim 13, wherein:

the spacer means are washer shaped rings slidably mounted on the rod.

12. The termite lure assembly according to claim 1, wherein:

the spacer means are knobs formed in the fiberboard disks.

13. The termite lure assembly according to claim 1, wherein:

the termite lure assembly includes an expansible plug adapted to be received within a hole passing through a slab wherein the expansible plug in an unexpanded state can be inserted into the hole passing through the slab and in an expanded state grips an internal surface of the hole passing through the slab to seal the hole passing through the slab.

14. The termite lure assembly according to claim 13, wherein:

an upper end of the rod is secured to an underside of the expansible plug.

15. A method of treating a colony of termites with a termiticide wherein a hole is formed through a slab, comprising:

providing a termite lure to be inserted in a hole passing through a slab; the termite lure consisting essentially of a grouping of fiberboard disks made of cellulose fibers; the grouping of fiberboard disks having a length and a longitudinal axis; the grouping of fiberboard disks having a lowermost fiberboard disk; spacer means spacing apart successive fiberboard disks of the grouping of fiberboard disks to simulate termite created cavities between the successive fiberboard disks; a rod, having a length greater than the length of the grouping of fiberboard disks, extending through the grouping of fiberboard disks along the longitudinal axis of the grouping of fiberboard disks; and the rod passing through a retaining means that frictionally grips a lateral surface of the rod and is slidably mounted on the rod; the retaining means slidably retaining the grouping of fiberboard disks on the rod so that the grouping of fiberboard disks can be moved vertically along the rod and positioned at different locations along the length of the rod to permit a lower end of the rod to extend from a lower end of the grouping of fiberboard disks for insertion of the rod into soil beneath the hole and the lowermost fiberboard disk of the grouping of fiberboard disks to be brought into contact with the soil beneath the hole;

inserting the termite lure into the hole passing through the slab;

placing the lowermost fiberboard disk of the termite lure in contact with the soil beneath the hole passing through the slab; and locating the rod of the termite lure to extend from an upper end of the grouping of fiberboard disks upward into the hole passing through the slab.

16. The method of treating a termite colony with a termiticide according to claim 15, wherein:

an expansible plug is inserted into the hole passing through the slab and expanded to grip an internal surface of the hole passing through the slab to seal the hole passing through the slab.

17. The method of treating a termite colony with a termiticide according to claim 16, wherein:

an upper end of the rod of the termite lure is secured to an underside of the expansible plug.

18. The method of treating a termite colony with a termiticide according to claim 15, wherein:

the cellulose fibers of the fiberboard disks are softwood fibers; and the fiberboard disks are treated with a non-repellant termiticide.

19. The method of treating a termite colony with a termiticide according to claim 15, including:

checking the termite lure for signs of termite activity; and when termite activity is detected, treating the soil beneath and surrounding the termite lure with a non-repellant termiticide.

20. The method of treating a termite colony with a termiticide according to claim 19, including:

when termite activity is detected, treating the fiberboard disks with a non-repellant termiticide.

21. The method of treating a termite colony with a termiticide according to claim 15, wherein:

the retaining means includes a first retaining member with a hub having a central hole therethrough that frictionally grips a lateral surface of the rod and spokes that extend radially outward from the hub and engage an underside of the lowermost fiberboard disk of the grouping of fiberboard disks.

22. The method of treating a termite colony with a termiticide according to claim 15, wherein:

the spacer means are knobs formed in the fiberboard disks.

* * * * *